United States Patent
Choi et al.

(10) Patent No.: US 11,421,081 B2
(45) Date of Patent: Aug. 23, 2022

(54) POLYIMIDE-POLYBENZOXAZOLE PRECURSOR SOLUTION, POLYIMIDE-POLYBENZOXAZOLE FILM, AND PREPARATION METHOD THEREFOR

(71) Applicant: KOLON INDUSTRIES, INC., Seoul (KR)

(72) Inventors: Doo Li Choi, Yongin-si (KR); Hak Gee Jung, Yongin-si (KR)

(73) Assignee: KOLON INDUSTRIES. INC., Seoul (KR)

( * ) Notice: Subject to any disclaimer, the term of this patent is extended or adjusted under 35 U.S.C. 154(b) by 10 days.

(21) Appl. No.: 17/187,055

(22) Filed: Feb. 26, 2021

(65) Prior Publication Data

US 2021/0179781 A1    Jun. 17, 2021

Related U.S. Application Data

(62) Division of application No. 15/740,982, filed as application No. PCT/KR2016/006946 on Jun. 29, 2016, now abandoned.

(30) Foreign Application Priority Data

Jun. 30, 2015 (KR) .................. 10-2015-0093710

(51) Int. Cl.
```
C08G 73/22      (2006.01)
C08J 5/18       (2006.01)
C08G 73/10      (2006.01)
C08G 61/12      (2006.01)
C08L 79/08      (2006.01)
```

(52) U.S. Cl.
CPC ........... *C08G 73/22* (2013.01); *C08G 61/122* (2013.01); *C08G 73/1039* (2013.01); *C08G 73/1042* (2013.01); *C08G 73/1057* (2013.01); *C08G 73/1067* (2013.01); *C08G 73/1071* (2013.01); *C08J 5/18* (2013.01); *C08J 2379/04* (2013.01); *C08J 2379/08* (2013.01); *C08L 79/08* (2013.01); *C08L 2201/10* (2013.01); *C08L 2203/16* (2013.01)

(58) Field of Classification Search
CPC .. C08G 73/22; C08G 61/122; C08G 73/1042; C08G 73/1039; C08G 73/1057; C08G 73/1067; C08G 73/1071; C08L 79/08; C08L 2201/10; C08L 2203/16; C08J 5/18; C08J 2379/08; C08J 2379/04
See application file for complete search history.

(56) References Cited

U.S. PATENT DOCUMENTS

| | | |
|---|---|---|
| 4,087,409 A | 5/1978 | Preston |
| 5,173,561 A | 12/1992 | Gupta |
| 6,291,635 B1 | 9/2001 | Maeda et al. |
| 6,548,621 B1 | 4/2003 | Tsai et al. |
| 2011/0311796 A1 | 12/2011 | Jung et al. |

FOREIGN PATENT DOCUMENTS

| | | |
|---|---|---|
| JP | 7-179605 A | 7/1995 |
| JP | H11-236449 A | 8/1999 |
| JP | 2000-290374 A | 10/2000 |
| JP | 2003-138014 A | 5/2003 |
| JP | 2006-143943 A | 6/2006 |
| JP | 2010-195856 A | 9/2010 |
| JP | 2010-536981 A | 12/2010 |
| KR | 10-932765 B | 12/2009 |
| KR | 10-2011-0118899 A | 11/2011 |
| KR | 10-2016-0007427 A | 1/2016 |

OTHER PUBLICATIONS

Guangliang Song et al., "Thermal expansion behavior of polyimide films containing benzoxazole unit", High Performance Polymers, 2014, pp. 1-7.
International Search Report for PCT/KR2016/006946 filed Oct. 12, 2016.
Sheng-Yen Wu et al., Synthesis and Properties of Aromatic Polyimide, PolyCbenzoxazole imide), and Poly(benzoxazole amide imide), Journal of Applied Polymer Science, vol. 113, pp. 2301-2312, 2009, 12 pages total.

*Primary Examiner* — Shane Fang
(74) *Attorney, Agent, or Firm* — Sughrue Mion, PLLC

(57) ABSTRACT

A polyimide-polybenzoxazole precursor solution, a polyimide-polybenzoxazole film, and a method of manufacturing the film are disclosed. A polyimide-polybenzoxazole film manufactured using the polyimide-polybenzoxazole precursor solution is formed by copolymerizing a unit structure of diamine and dianhydride and a unit structure of diaminophenol and dicarbonyl chloride in an organic solvent. The film is colorless and transparent, like conventional polyimide films, and can exhibit improved heat resistance and low birefringence.

10 Claims, No Drawings

POLYIMIDE-POLYBENZOXAZOLE PRECURSOR SOLUTION, POLYIMIDE-POLYBENZOXAZOLE FILM, AND PREPARATION METHOD THEREFOR

CROSS REFERENCE TO RELATED APPLICATIONS

This application is a Divisional Application of U.S. application Ser. No. 15/740,982 filed Dec. 29, 2017, which is a National Stage of International Application No. PCT/KR2016/006946 filed Jun. 29, 2016, claiming priority based on Korean Patent Application No. 10-2015-0093710 filed Jun. 30, 2015, the contents of all of which are incorporated herein by reference in their entirety.

TECHNICAL FIELD

The present invention relates to a polyimide-polybenzoxazole precursor solution, a polyimide-polybenzoxazole film, and a method of manufacturing the same.

BACKGROUND ART

A polyimide (PI) film is generally formed from a polyimide resin. Here, "polyimide resin" refers to a highly heat-resistant resin prepared by subjecting an aromatic dianhydride and an aromatic diamine or an aromatic diisocyanate to solution polymerization, thus preparing a polyamic acid derivative, which is then subjected to ring-closing dehydration at a high temperature so as to be imidized.

Such a polyimide film has excellent mechanical properties, heat resistance and electrical insulating properties, and is thus widely utilized in the fields of electronic materials, such as semiconductor insulating layers, electrode-protecting films for TFT-LCDs, substrates for flexible printed wiring boards, and the like.

However, a polyimide resin is brown- or yellow-colored, attributable to its high aromatic ring density, and thus has low transmittance in the visible light range. Additionally, it tends to take on a yellowish color, which decreases light transmittance and increases birefringence, making it difficult to utilize it for optical members.

With the goal of solving such problems, many attempts have been made to obtain a polyimide having high transparency using an alicyclic monomer or to polymerize a polyimide having a fluorene structure.

Japanese Patent No. 2010-180349 and WO 2008/010494 disclose a polyimide having a fluorene structure and a polyimide prepared with an alicyclic monomer. Here, the above polyimide has high transparency but deteriorated thermal and mechanical properties.

U.S. Pat. Nos. 4,595,548, 4,603,061, 4,645,824, 4,895,972, 5,218,083, 5,093,453, 5,218,077, 5,367,046, 5,338,826, 5,986,036 and 6,232,428 and Korean Patent Application Publication No. 2003-0009437 disclose a novel polyimide having improved transmittance and color transparency in the range within which thermal properties are not significantly deteriorated, using aromatic dianhydride and aromatic diamine monomers, having a linker such as —O—, —$SO_2$—, $CH_2$—, etc., a bent structure due to the connection to an m-position rather than a p-position, or a substituent such as —$CF_3$, etc., but the above polyimide is unsuitable for use in display devices, such as OLEDs, TFT-LCDs, flexible displays, and the like, in terms of mechanical properties, heat resistance, and birefringence.

DISCLOSURE

Technical Problem

Accordingly, the present invention is intended to provide a polyamic acid-polyhydroxyamide and a polyimide-polybenzoxazole film, in which the properties of conventional polyimide films are maintained and polybenzoxazole and a precursor thereof are introduced to thus improve heat resistance and birefringence, and a method for manufacturing such a polyimidepolybenzoxazole film.

Specifically, when polybenzoxazole is introduced, heat resistance and birefringence, among the properties of a colorless and transparent polyimide resin, may be improved, thereby obtaining an excellent polyimide film.

Technical Solution

Therefore, a preferred first embodiment of the present invention provides a polyimide-polybenzoxazole precursor solution, including polyhydroxyamide, which is a polymer of a diaminophenol compound and a dicarbonyl chloride compound, and polyamic acid, which is a polymer of a dianhydride compound and a diamine compound.

In the first embodiment, polyhydroxyamide may be contained in an amount of 20 to 80 mol % based on the total molar amount of polyhydroxyamide and polyamic acid.

In the first embodiment, polyhydroxyamide may be contained in an amount of 40 to 60 mol % based on the total molar amount of polyhydroxyamide and polyamic acid.

In the first embodiment, the diaminophenol compound may be at least one selected from the group consisting of 2,2-bis(3-amino-4-hydroxyphenyl) hexafluoropropane (6FAP), bis(3-amino-4-hydroxyphenyl)sulfone (BAS), 3,3'-dihydroxybenzidine (HAB), 2,2-bis(3-amino-4-hydroxyphenyl)propane, and 9,9-bis(3-amino-4-hydroxyphenyl)fluorene.

In the first embodiment, the dicarbonyl chloride compound may be at least one selected from the group consisting of phthaloyl chloride, terephthaloyl chloride (TPC), isophthaloyl chloride (IPC), 4,4'-biphenyldicarbonyl chloride (DPDOC), 4,4'-oxybis(benzoyl chloride) (OBBOC), and naphthalene-2,3-dicarbonyl dichloride.

In the first embodiment, the dianhydride compound may be at least one selected from the group consisting of 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic anhydride (IDA), pyromellitic dianhydride (PMDA, 1,2,4,5-benzene tetracarboxylic dianhydride), 3,3,4,4-benzophenone tetracarboxylic dianhydride (BTDA), 3,3,4,4-biphenyltetracarboxylic dianhydride (BPDA), 4,4-oxydiphthalic dianhydride (ODPA), bis(3,4-dicarboxyphenyl)dimethylsilane dianhydride (SiDA), 4,4-bis(3,4-dicarboxyphenoxy)diphenyl sulfide dianhydride (BDSDA), sulfonyldiphthalic anhydride ($SO_2$DPA), cyclobutane-1,2,3,4-tetracarboxylic dianhydride (CBDA), and 4,4'-(4,4'-isopropylidenediphenoxy)bis(phthalic anhydride) (6HBDA).

In the first embodiment, the diamine compound may be at least one selected from the group consisting of 4,4'-oxydianiline (ODA), para-phenylene diamine (pPDA), meta-phenylene diamine (mPDA), para-methylene dianiline (pMDA), meta-methylene dianiline (mMDA), 1,3-bis(3-aminophenoxy)benzene (133APB), 1,3-bis(4-aminophenoxy)benzene (134APB), 2,2'-bis[4(4-aminophenoxy)phenyl]hexafluoropropane (4BDAF), 2,2'-bis(3-aminophenyl)hexafluoropropane (33-6F), 2,2'-bis(4-aminophenyl)

hexafluoropropane (44-6F), bis(4-aminophenyl)sulfone (ODDS), bis(3-aminophenyl)sulfone (3DDS), 2,2'-bis(trifluoromethyl)benzidine (TFDB), 1,3-cyclohexanediamine (13CHD), 1,4-cyclohexanediamine (14CHD), 2,2-bis[4-(4-aminophenoxy)phenyl]propane (6HMDA), 2,2-bis(3-amino-4-hydroxyphenyl)hexafluoropropane (DBOH), and 4,4'-bis(3-aminophenoxy)diphenyl sulfone (DBSDA).

In addition, a preferred second embodiment of the present invention provides a polyimide-polybenzoxazole film, including a first repeating unit resulting from ring-closing dehydration of a polymer of a diaminophenol compound and a dicarbonyl chloride compound and a second repeating unit resulting from ring-closing dehydration of a polymer of a dianhydride compound and a diamine compound.

In the second embodiment, the first repeating unit may be contained in an amount of 20 to 80 mol % based on the total molar amount of the first repeating unit and the second repeating unit.

In the second embodiment, the first repeating unit may be contained in an amount of 40 to 60 mol % based on the total molar amount of the first repeating unit and the second repeating unit.

In the second embodiment, the polyimide-polybenzoxazole film may have a birefringence of 0.010 or less.

In the second embodiment, the polyimide-polybenzoxazole film may have a coefficient of linear thermal expansion (CTE) of 55 ppm/° C. or less.

In the second embodiment, the polyimide-polybenzoxazole film may have a transmittance of 88% or more and a yellow index of 10 or less.

Also, a preferred third embodiment of the present invention provides a method of manufacturing a polyimide-polybenzoxazole film, comprising: polymerizing a diaminophenol compound and a dicarbonyl chloride compound, thus preparing a polyhydroxyamide solution (S1);

adding the polyhydroxyamide solution of S1 with a diamine compound and a dianhydride compound and performing polymerization to give a polyamic acid solution, thus preparing a polyimide-polybenzoxazole precursor solution (S2); and casting the polyimide-polybenzoxazole precursor solution on a support and performing ring-closing dehydration through thermal treatment (S3).

In the third embodiment, the polymerizing in S1 may be performed at 0° C. to 20° C. for 1 to 2 hr.

In the third embodiment, the polymerization in S2 may be performed at 25° C. to 45° C. for 2 to 5 hr.

In the third embodiment, the thermal treatment in S3 may be performed for 60 min to 180 min through heating in the temperature range of 80° C. to 300° C.

In the third embodiment, an equivalent ratio of the diaminophenol compound and the dicarbonyl chloride compound in S1 may be 1:0.8~1.2, and an equivalent ratio of the diamine compound and the dianhydride compound in S2 may be 1:0.8~1.2.

In the third embodiment, an equivalent ratio of the polyhydroxyamide solution in S1 and the polyamic acid solution in S2 may be 0.2~0.8:0.8~0.2.

Advantageous Effects

According to the present invention, precursors obtained by copolymerizing diaminophenol, dicarbonyl chloride, diamine and dianhydride are subjected to ring-closing dehydration, thereby completing a film including a polybenzoxazole unit structure and a polyimide unit structure. When the molar fraction of the polybenzoxazole unit structure of the film is adjusted, a polyimide-polybenzoxazole film having superior heat resistance and birefringence and also high optical properties can be provided.

BEST MODE

According to the present invention, a polyimide-polybenzoxazole precursor solution including polyhydroxyamide, which is a polymer of a diaminophenol compound and a dicarbonyl chloride compound, and polyamic acid, which is a polymer of a dianhydride compound and a diamine compound, is prepared, and a film is manufactured through ring-closing dehydration of the polyimide-polybenzoxazole precursor solution.

Hereinafter, a detailed description will be given of the present invention.

A first embodiment of the present invention addresses a polyimide-polybenzoxazole precursor solution, including polyhydroxyamide, which is a polymer of a diaminophenol compound and a dicarbonyl chloride compound, and polyamic acid, which is a polymer of a dianhydride compound and a diamine compound.

In the present invention, the polybenzoxazole unit structure is prepared by polymerizing diaminophenol and dicarbonyl chloride, and is then introduced to a polyimide film, thereby obtaining a property in which the extent of formation of an intermolecular charge transfer complex is increased due to an increase in the number of conjugated double bonds in the structure thereof. By virtue of this property, upon the completion of a final film, the advantage of improved heat resistance may be obtained, although yellow index and transmittance may decrease due to changes in the absorption wavelength.

Here, polyhydroxyamide is preferably contained in an amount of 20 to 80 mol % based on the total molar amount of polyhydroxyamide and polyamic acid. If the amount of polyhydroxyamide is less than 20 mol %, the extent of improvement of thermal properties and birefringence may be insufficient. On the other hand, if the amount thereof exceeds 80 mol %, the yellow index of the film may be 10 or more. More preferably, the amount thereof falls in the range of 40 to 60 mol % in order to attain desired thermal properties, birefringence and yellow index.

In the present invention, the dicarbonyl chloride may include phthaloyl chloride, terephthaloyl chloride (TPC), isophthaloyl chloride, 4,4'-biphenyldicarbonyl chloride, 4,4'-oxybis(benzoyl chloride), and naphthalene-2,3-dicarbonyl dichloride, which may be used alone or in combinations of two or more. Preferably, isophthaloyl chloride (IPC), 4,4'-biphenyldicarbonyl chloride (DPDOC), or 4,4'-oxybis(benzoyl chloride) (OBBOC) is used in order to increase heat resistance.

In the present invention, the diaminophenol may include 2,2-bis(3-amino-4-hydroxyphenyl)hexafluoropropane (6FAP), bis(3-amino-4-hydroxyphenyl)sulfone (BAS), 3,3'-dihydroxybenzidine (HAB), 2,2-bis(3-amino-4-hydroxyphenyl)propane, and 9,9-bis(3-amino-4-hydroxyphenyl)fluorene, which may be used alone or in combinations of two or more. The diaminophenol compound is not limited to the above examples, but 6FAP, BAS or HAB is preferably used, and the use of bis(3-amino-4-hydroxyphenyl)sulfone (BAS) is most preferable in order to increase heat resistance.

In the present invention, the diamine may include, but is not limited to, 4,4'-oxydianiline (ODA), para-phenylene diamine (pPDA), meta-phenylene diamine (mPDA), para-methylene dianiline (pMDA), meta-methylene dianiline (mMDA), 1,3-bis(3-aminophenoxy)benzene (133APB), 1,3-bis(4-aminophenoxy)benzene (134APB), 2,2'-bis[4(4-aminophenoxy)phenyl]hexafluoropropane (4BDAF), 2,2'-bis(3-aminophenyl)hexafluoropropane (33-6F), 2,2'-bis(4-aminophenyl)hexafluoropropane (44-6F), bis(4-aminophenyl)sulfone (ODDS), bis(3-aminophenyl)sulfone (3DDS), 2,2'-bis(trifluoromethyl)benzidine (TFDB), 1,3-cyclohexanediamine (13CHD), 1,4-cyclohexanediamine (14CHD), 2,2-bis[4-(4-aminophenoxy)phenyl]propane (6HMDA), 2,2-bis(3-amino-4-hydroxyphenyl)hexafluoropropane (DBOH), and 4,4'-bis(3-aminophenoxy)diphenyl sulfone (DBSDA). These diamines may be used alone or in combinations of two or more.

In the present invention, the dianhydride may include, but is not limited to, 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic anhydride (TDA), pyromellitic dianhydride (PMDA, 1,2,4,5-benzene tetracarboxylic dianhydride), 3,3,4,4-benzophenone tetracarboxylic dianhydride (BTDA), 3,3,4,4-biphenyltetracarboxylic dianhydride (BPDA), 4,4-oxydiphthalic dianhydride (ODPA), bis(3,4-dicarboxyphenyl)dimethylsilane dianhydride (SiDA), 4,4-bis(3,4-dicarboxyphenoxy)diphenyl sulfide dianhydride (BDSDA), sulfonyldiphthalic anhydride ($SO_2DPA$), cyclobutane-1,2,3,4-tetracarboxylic dianhydride (CBDA), and 4,4'-(4,4'-isopropylidenediphenoxy)bis(phthalic anhydride) (6HBDA). These dianhydrides may be used alone or in combinations of two or more.

The present invention addresses a method of manufacturing a film using the above precursor solution, comprising the following steps of:

polymerizing a diaminophenol compound and a dicarbonyl chloride compound, thus preparing a polyhydroxyamide solution (S1);

adding the polyhydroxyamide solution of S1 with a diamine compound and a dianhydride compound and performing polymerization to give a polyamic acid solution, thus preparing a polyimide-polybenzoxazole precursor solution (S2); and casting the polyimide-polybenzoxazole precursor solution on a support and performing ring-closing dehydration through thermal treatment (S3).

In S1, the polyhydroxyamide solution is prepared. Here, the polymerization is preferably carried out at 0° C. to 20° C. for 1 to 2 hr.

The equivalent ratio of the diaminophenol compound and the dicarbonyl chloride compound is 1:0.8~1.2.

In S2, the polyamic acid solution is prepared. Here, the polymerization is preferably carried out at 25° C. to 45° C. for 2 to 5 hr. The equivalent ratio of the diamine compound and the dianhydride compound is 1:0.8~1.2.

In S3, a polybenzoxazole unit structure is formed through ring-closing dehydration of polyhydroxyamide, and a polyimide unit structure is formed through ring-closing dehydration of polyamic acid.

The polyhydroxyamide may be converted into polybenzoxazole through a thermal conversion process. The imidization of the polyamic acid solution may include thermal imidization and chemical imidization. Preferably chemical imidization is carried out. More preferably, the solution subjected to chemical imidization is precipitated, purified, dried, dissolved again in a solvent and then used. This solvent is as described above. The chemical imidization process is performed by adding the polyamic acid solution with a dehydrating agent including an acid anhydride such as acetic anhydride, etc. and an imidization catalyst including a tertiary amine such as isoquinoline, β-picoline, pyridine, etc. Alternatively, a combination of thermal imidization and chemical imidization may be performed. The heating conditions may vary depending on the kind of polyamic acid solution, the thickness of the film, and the like.

Here, the reaction conditions are not particularly limited, but the reaction is more preferably carried out in an inert gas atmosphere such as argon or nitrogen.

In the present invention, the organic solvent that may be used for solution polymerization of individual monomers is not particularly limited so long as it dissolves polyamic acid and polyhydroxyamide. Known reaction solvents may include at least one polar solvent selected from among m-cresol, N-methyl-2-pyrrolidone (NMP), dimethylformamide (DMF), dimethylacetamide (DMAc), dimethylsulfoxide (DMSO), acetone, ethyl acetate, diethylformamide (DEF), diethyl acetamide (DEA), propylene glycol monomethyl ether (PGME), and propylene glycol monomethyl ether acetate (PGMEA). In addition thereto, a low-boiling-point solution, such as tetrahydrofuran (THF) or chloroform, or a low-absorbency solvent such as γ-butyrolactone may be utilized. These solvents may be used alone or in combinations of two or more depending on the purpose of use.

The amount of the organic solvent is not particularly limited, but is preferably 50~95 wt %, and more preferably 70~90 wt %, based on the total amount of the polyamic acid and polyhydroxyamide solutions, in order to obtain appropriate molecular weight and viscosity of the polyamic acid and polyhydroxyamide solutions.

The equivalent ratio of polyhydroxyamide in S1 and polyamic acid solution in S2 may be 0.2~0.8:0.8~0.2. When the equivalent ratio is adjusted within the above range, optimal heat resistance, birefringence, and optical properties may be obtained. Here, as the proportion of the polyhydroxyamide solution relative to the polyamic acid solution increases, heat resistance and birefringence are improved but optical properties are deteriorated. In particular, the most preferable effects may be obtained at an equivalent ratio of 0.4:0.6~0.6:0.4. Accordingly, the molar ratio is preferably set in the range of 0.4:0.6 to 0.6:0.4.

After chemical imidization, precipitation, drying and dissolution in a solvent are performed to give a solution, which is then applied on a support, and the applied film is gelled on the support using dry air and thermal treatment. The temperature for gelling of the applied film is preferably 100~250° C., and the support may be a glass plate, a piece of aluminum foil, a circulating stainless belt or a stainless drum.

The processing time necessary for gelling may vary depending on the temperature, the kind of support, the amount of applied polyamic acid solution, and the mixing conditions of the catalyst, and is not limited to a certain level. Preferably, the gelling time falls in the range of 5 min~30 min.

The gelled film is stripped from the support and thermally treated, thus completing drying and imidization. The thermal treatment is performed in the temperature range of 100~500° C. for 1 min~30 min. The gelled film is subjected to thermal treatment in the state in which it is fixed to a frame. The gelled film may be fixed using a pin- or clip-type frame.

After completion of the thermal treatment, the film has a residual volatile content of 5% or less, and preferably 3% or less.

After completion of the thermal treatment, the film is thermally treated under predetermined tension, thereby removing residual stress from the inside of the film. Unless final thermal treatment is performed, the coefficient of thermal expansion is very different, that is, is excessively decreased, compared to conventional films. This is because residual stress that acts to shrink the film reduces thermal expansion. The hysteresis of the coefficient of thermal expansion may be reduced through thermal treatment. Here, the tension and the temperature are correlated and thus the tension conditions may vary depending on the temperature. The temperature is preferably maintained in the range of 100~500° C., and the time is preferably maintained in the range of 1 min to 3 hr. The thickness of the obtained polyimide-polybenzoxazole film is not particularly limited, but preferably falls in the range from 10~250 μm, and more preferably from 10~100 μm.

As described above, the component comprising diaminophenol and dicarbonyl chloride and the component comprising diamine and dianhydride are dissolved in the organic solvent in equimolar amounts and then allowed to react, thus preparing the polyimide-polybenzoxazine precursor solution, which is then cast and thermally treated so as to carry out ring-closing dehydration, thereby manufacturing a film.

In addition, the present invention addresses a polyimide-polybenzoxazole film, including a first repeating unit resulting from ring-closing dehydration of a polymer of a diaminophenol compound and a dicarbonyl chloride compound, and a second repeating unit resulting from ring-closing dehydration of a polymer of a dianhydride compound and a diamine compound.

The first repeating unit may be contained in an amount of 20 to 80 mol % based on the total molar amount of the first repeating unit and the second repeating unit. If the amount of the first repeating unit is less than 20 mol % based on the total molar amount thereof, the improvement in thermal properties may become insignificant. On the other hand, if the amount thereof exceeds 80 mol %, the yellow index may be 10 or more. More preferably, the amount thereof falls in the range of 40 to 60 mol % in order to attain desired thermal properties and yellow index.

In the present invention, the polyimide-polybenzoxazole film including a first repeating unit, represented by Chemical Formula 1 below, which is a polymerization product of diaminophenol and dicarbonyl chloride, and a second repeating unit, represented by Chemical Formula 2 below, which is a polymerization product of diamine and dianhydride, may be manufactured from the precursor solution.

<Chemical Formula 1>

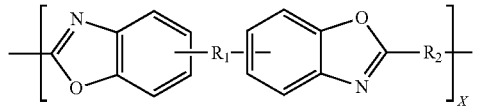

<Chemical Formula 2>

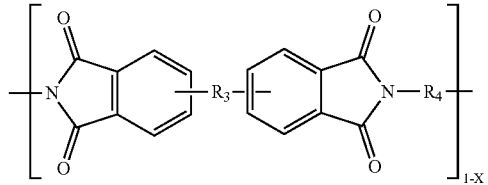

In Chemical Formulas 1 and 2, X and 1-X designate molar fractions, satisfying 0<X<1, R1 may be a structure derived from diaminophenol, such as 2,2-bis(3-amino-4-hydroxyphenyl)hexafluoropropane (6FAP), bis(3-amino-4-hydroxyphenyl)sulfone (BAS), 3,3'-dihydroxybenzidine (HAB), 2,2-bis(3-amino-4-hydroxyphenyl)propane, and 9,9-bis(3-amino-4-hydroxyphenyl)fluorene, and R2 may be a structure derived from dicarbonyl chloride, such as phthaloyl chloride, terephthaloyl chloride (TPC), isophthaloyl chloride, 4,4'-biphenyldicarbonyl chloride, 4,4'-oxybis(benzoyl chloride), and naphthalene-2,3-dicarbonyl dichloride. R3 may be a structure derived from dianhydride, such as 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic anhydride (TDA), pyromellitic dianhydride (PMDA, 1,2,4,5-benzene tetracarboxylic dianhydride), 3,3,4,4-benzophenone tetracarboxylic dianhydride (BTDA), 3,3,4,4-biphenyltetracarboxylic dianhydride (BPDA), 4,4-oxydiphthalic dianhydride (ODPA), bis(3,4-dicarboxyphenyl)dimethylsilane dianhydride (SiDA), 4,4-bis(3,4-dicarboxyphenoxy)diphenyl sulfide dianhydride (BDSDA), sulfonyldiphthalic anhydride ($SO_2DPA$), cyclobutane-1,2,3,4-tetracarboxylic dianhydride (CBDA), and 4,4'-(4,4'-isopropylidenediphenoxy)bis(phthalic anhydride) (6HBDA), and R4 may be a structure derived from diamine, such as 4,4'-oxydianiline (ODA), para-phenylene diamine (pPDA), meta-phenylene diamine (mPDA), para-methylene dianiline (pMDA), meta-methylene dianiline (mMDA), 1,3-bis(3-aminophenoxy)benzene (133APB), 1,3-bis(4-aminophenoxy)benzene (134APB), 2,2'-bis[4-(4-aminophenoxy)phenyl]hexafluoropropane (4BDAF), 2,2'-bis(3-aminophenyl)hexafluoropropane (33-6F), 2,2'-bis(4-aminophenyl)hexafluoropropane (44-6F), bis(4-aminophenyl) sulfone (4DDS), bis(3-aminophenyl) sulfone (3DDS), 2,2'-bis(trifluoromethyl)benzidine (TFDB), 1,3-cyclohexanediamine (13CHD), 1,4-cyclohexanediamine (14CHD), 2,2-bis[4-(4-aminophenoxy)phenyl]propane (6HMDA), 2,2-bis(3-amino-4-hydroxyphenyl)hexafluoropropane (DBOH), and 4,4'-bis(3-aminophenoxy) diphenyl sulfone (DBSDA).

The polyimide film of the present invention, satisfying criteria for light transmittance, yellow index and heat resistance, may be applied to fields requiring transparency, in which the use of existing polyimide films has been limited owing to the yellow color thereof, including image display devices, such as protective layers or diffusion plates and coating layers in TFT-LCDs, for example, interlayers, gate insulators and liquid crystal alignment layers in TFT-LCDs. When the transparent polyimide of the invention is used for a liquid crystal alignment layer, it may contribute to an increase in an aperture ratio, making it possible to manufacture a TFT-LCD having high contrast. Moreover, the film of the invention may be utilized as a hard coating film and a flexible display substrate in lieu of glass in existing displays.

The polybenzoxazole-imide film of the present invention has a coefficient of thermal expansion (CTE) of 55 ppm/° C. or less at 50~250° C., and is colorless and transparent. The CTE is determined by measuring a coefficient of linear thermal expansion two times at 50~250° C. using a TMA (TA Instruments, Q400) through a TMA method. Here, the sample is 4 mm×24 mm in size, the load is 0.02 N, and the heating rate is 10° C./min.

The polyimide-polybenzoxazole film has an average transmittance of 80% or more at 380~780 nm and an average transmittance of 85% or more at 551~780 nm, measured using a UV spectrophotometer for a film thickness of 10~100 μm. The average transmittance is determined by measuring the transmittance three times at 550 nm using a UV spectrophotometer (Konica Minolta CM-3700d) and averaging the measurements.

Here, the polyimide-polybenzoxazole film has a transmittance of 85% or more at 550 nm and a transmittance of 80% or more at 500 nm, measured using a UV spectrophotometer for a film thickness of 10~100 μm.

The polyimide-polybenzoxazole film has a yellow index of 10 or less for a film thickness of 10~100 μm. The yellow index is measured in accordance with ASTM E313 using a UV spectrophotometer (Konica Minolta CM-3700d). Thereby, the polybenzoxazole-polyimide film of the present invention can be found to be colorless and transparent.

The polyimide-polybenzoxazole film has a birefringence ($\Delta n$=TE (Transverse Electric)–TM (Transverse Magnetic)) of 0.010 or less. The birefringence is determined by measuring each of TE (Transverse Electric) and TM (Transverse Magnetic) modes three times at 532 nm using a birefringence analyzer (Prism Coupler, Sairon SPA4000) and averaging the measurements.

The properties, such as CTE, transmittance, yellow index, and the like, may be determined using a film having a thickness of 10~100 μm, for example, a film having a thickness of each of 11 μm, 12 μm, 13 μm, ..., 100 μm. Within the above thickness range, all of the above properties may be satisfied. Here, the above film thickness range pertains to the measurement method for measuring the properties, and is not to be regarded as limiting the thickness of the film unless otherwise mentioned.

Also, the polyimide-polybenzoxazole film according to the present invention may satisfy criteria for all properties including CTE, transmittance, yellow index, and birefringence.

Ultimately, the present invention addresses an image display device including the polyimide-polybenzoxazole film.

MODE FOR INVENTION

Examples

A better understanding of the present invention may be obtained through the following examples, which are set forth to illustrate, but are not to be construed as limiting the scope of the present invention.

Example 1

After a 500 ml reactor equipped with a stirrer, a nitrogen injector, a dropping funnel, a temperature controller and a condenser was purged with nitrogen, 284.867 g of N-methyl-2-pyrrolidone (NMP) was placed in the reactor and 7.398 g (0.022 mol) of 6FAP was dissolved therein, after which 4.466 g (0.022 mol) of IPC was added thereto at 10° C. and allowed to react for 2 hr. Thereafter, 28.180 g (0.088 mol) of TFDB was dissolved therein, after which 15.535 g (0.053 mol) of BPDA was added thereto and allowed to react for 5 hr, and 15.638 g (0.035 mol) of 6FDA was added thereto. The resulting solution was maintained at room temperature and allowed to react for 18 hr, thereby obtaining a solution having a solid content of 20 wt % and a viscosity of 202 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Example 2

After a 500 ml reactor equipped with a stirrer, a nitrogen injector, a dropping funnel, a temperature controller and a condenser was purged with nitrogen, 272.971 g of N-methyl-2-pyrrolidone (NMP) was placed in the reactor and 14.795 g (0.044 mol) of 6FAP was dissolved therein, after which 8.933 g (0.044 mol) of IPC was added thereto at 10° C. and allowed to react for 2 hr. Thereafter, 21.135 g (0.066 mol) of TFDB was dissolved therein, after which 11.651 g (0.040 mol) of BPDA was added thereto and allowed to react for 5 hr, and 11.728 g (0.026 mol) of 6FDA was added thereto. The resulting solution was maintained at room temperature and allowed to react for 18 hr, thereby obtaining a solution having a solid content of 20 wt % and a viscosity of 187 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Example 3

After a 500 ml reactor equipped with a stirrer, a nitrogen injector, a dropping funnel, a temperature controller and a condenser was purged with nitrogen, 261.075 g of N-methyl-2-pyrrolidone (NMP) was placed in the reactor and 22.193 g (0.066 mol) of 6FAP was dissolved therein, after which 13.399 g (0.066 mol) of IPC was added thereto at 10° C. and allowed to react for 2 hr. Thereafter, 14.090 g (0.044 mol) of TFDB was dissolved therein, after which 7.767 g (0.026 mol) of BPDA was added thereto and allowed to react for 5 hr, and 7.819 g (0.018 mol) of 6FDA was added thereto. The resulting solution was maintained at room temperature and allowed to react for 18 hr, thereby obtaining a solution having a solid content of 20 wt % and a viscosity of 161 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 13 μm.

Example 4

After a 500 ml reactor equipped with a stirrer, a nitrogen injector, a dropping funnel, a temperature controller and a condenser was purged with nitrogen, 254.357 g of N-methyl-2-pyrrolidone (NMP) was placed in the reactor and 29.591 g (0.088 mol) of 6FAP was dissolved therein, after which 17.866 g (0.088 mol) of IPC was added thereto at 10° C. and allowed to react for 2 hr. Thereafter, 7.045 g (0.022 mol) of TFDB was dissolved therein, after which 3.884 g (0.013 mol) of BPDA was added thereto and allowed to react for 5 hr, and 3.909 g (0.009 mol) of 6FDA was added thereto. The resulting solution was maintained at room temperature and allowed to react for 18 hr, thereby obtaining a solution having a solid content of 20 wt % and a viscosity of 160 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 13 μm.

Example 5

After a 500 ml reactor equipped with a stirrer, a nitrogen injector, a dropping funnel, a temperature controller and a condenser was purged with nitrogen, 289.387 g of N-methyl-2-pyrrolidone (NMP) was placed in the reactor and 5.606 g (0.020 mol) of BAS was dissolved therein, after which 5.582 g (0.020 mol) of DPDOC was added thereto at 10° C. and allowed to react for 2 hr. Thereafter, 25.618 g (0.080 mol) of TFDB was dissolved therein, after which 35.540 g (0.080 mol) of 6FDA was added thereto and allowed to react for 5 hr. The resulting solution was maintained at room temperature and allowed to react for 18 hr, thereby obtaining a solution having a solid content of 20 wt % and a viscosity of 245 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 11 μm.

Example 6

After a 500 ml reactor equipped with a stirrer, a nitrogen injector, a dropping funnel, a temperature controller and a condenser was purged with nitrogen, 272.982 g of N-methyl-2-pyrrolidone (NMP) was placed in the reactor and 11.212 g (0.040 mol) of BAS was dissolved therein, after which 11.165 g (0.040 mol) of DPDOC was added thereto at 10° C. and allowed to react for 2 hr. Thereafter, 19.124 g (0.060 mol) of TFDB was dissolved therein, after which 26.655 g (0.60 mol) of 6FDA was added thereto and allowed to react for 5 hr. The resulting solution was maintained at room temperature and allowed to react for 18 hr, thereby obtaining a solution having a solid content of 20 wt % and a viscosity of 238 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 13 μm.

Example 7

After a 500 ml reactor equipped with a stirrer, a nitrogen injector, a dropping funnel, a temperature controller and a condenser was purged with nitrogen, 256.578 g of N-methyl-2-pyrrolidone (NMP) was placed in the reactor and 16.818 g (0.060 mol) of BAS was dissolved therein, after which 16.747 g (0.060 mol) of DPDOC was added thereto at 10° C. and allowed to react for 2 hr. Thereafter, 12.809 g (0.040 mol) of TFDB was dissolved therein, after which 17.770 g (0.040 mol) of 6FDA was added thereto and allowed to react for 5 hr. The resulting solution was maintained at room temperature and allowed to react for 18 hr, thereby obtaining a solution having a solid content of 20 wt % and a viscosity of 232 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Example 8

After a 500 ml reactor equipped with a stirrer, a nitrogen injector, a dropping funnel, a temperature controller and a condenser was purged with nitrogen, 240.173 g of N-methyl-2-pyrrolidone (NMP) was placed in the reactor and 22.424 g (0.080 mol) of BAS was dissolved therein, after which 22.330 g (0.080 mol) of DPDOC was added thereto at 10° C. and allowed to react for 2 hr. Thereafter, 6.405 g (0.020 mol) of TFDB was dissolved therein, after which 8.885 g (0.020 mol) of 6FDA was added thereto and allowed to react for 5 hr. The resulting solution was maintained at room temperature and allowed to react for 18 hr, thereby obtaining a solution having a solid content of 20 wt % and a viscosity of 221 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Example 9

After a 500 ml reactor equipped with a stirrer, a nitrogen injector, a dropping funnel, a temperature controller and a condenser was purged with nitrogen, 240.406 g of N-methyl-2-pyrrolidone (NMP) was placed in the reactor and 5.606 g (0.020 mol) of BAS was dissolved therein, after which 4.060 g (0.020 mol) of IPC was added thereto at 10° C. and allowed to react for 2 hr. Thereafter, 25.618 g (0.080 mol) of TFDB was dissolved therein, after which 24.817 g (0.080 mol) of ODPA was added thereto and allowed to react for 5 hr. The resulting solution was maintained at room temperature and allowed to react for 18 hr, thereby obtaining a solution having a solid content of 20 wt % and a viscosity of 220 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Example 10

After a 500 ml reactor equipped with a stirrer, a nitrogen injector, a dropping funnel, a temperature controller and a condenser was purged with nitrogen, 228.637 g of N-methyl-2-pyrrolidone (NMP) was placed in the reactor and 11.212 g (0.040 mol) of BAS was dissolved therein, after which 8.121 g (0.040 mol) of IPC was added thereto at 10° C. and allowed to react for 2 hr. Thereafter, 19.214 g (0.060 mol) of TFDB was dissolved therein, after which 18.613 g (0.060 mol) of ODPA was added thereto and allowed to react for 5 hr. The resulting solution was maintained at room temperature and allowed to react for 18 hr, thereby obtaining a solution having a solid content of 20 wt % and a viscosity of 215 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 13 μm.

Example 11

After a 500 ml reactor equipped with a stirrer, a nitrogen injector, a dropping funnel, a temperature controller and a condenser was purged with nitrogen, 216.867 g of N-methyl-2-pyrrolidone (NMP) was placed in the reactor and 16.818 g (0.060 mol) of BAS was dissolved therein, after which 12.181 g (0.060 mol) of IPC was added thereto at 10° C. and allowed to react for 2 hr. Thereafter, 12.809 g (0.040 mol) of TFDB was dissolved therein, after which 12.408 g (0.040 mol) of ODPA was added thereto and allowed to react for 5 hr. The resulting solution was maintained at room temperature and allowed to react for 18 hr, thereby obtaining a solution having a solid content of 20 wt % and a viscosity of 218 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Example 12

After a 500 ml reactor equipped with a stirrer, a nitrogen injector, a dropping funnel, a temperature controller and a condenser was purged with nitrogen, 205.098 g of N-methyl-2-pyrrolidone (NMP) was placed in the reactor and 22.424 g (0.080 mol) of BAS was dissolved therein, after which 16.242 g (0.080 mol) of IPC was added thereto at 10° C. and allowed to react for 2 hr. Thereafter, 6.405 g (0.020 mol) of TFDB was dissolved therein, after which 6.204 g (0.020 mol) of ODPA was added thereto and allowed to react for 5 hr. The resulting solution was maintained at room temperature and allowed to react for 18 hr, thereby obtaining a solution having a solid content of 20 wt % and a viscosity of 209 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Example 13

After a 500 ml reactor equipped with a stirrer, a nitrogen injector, a dropping funnel, a temperature controller and a condenser was purged with nitrogen, 258.498 g of N-methyl-2-pyrrolidone (NMP) was placed in the reactor and 7.325 g (0.020 mol) of 6FAP was dissolved therein, after which 5.902 g (0.020 mol) of OBBOC was added thereto at 10° C. and allowed to react for 2 hr. Thereafter, 25.618 g (0.080 mol) of TFDB was dissolved therein, after which 25.778 g (0.080 mol) of BTDA was added thereto and allowed to react for 5 hr. The resulting solution was maintained at room temperature and allowed to react for 18 hr, thereby obtaining a solution having a solid content of 20 wt % and a viscosity of 249 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 11 μm.

Example 14

After a 500 ml reactor equipped with a stirrer, a nitrogen injector, a dropping funnel, a temperature controller and a condenser was purged with nitrogen, 260.011 g of N-methyl-2-pyrrolidone (NMP) was placed in the reactor and 14.650 g (0.040 mol) of 6FAP was dissolved therein, after which 11.805 g (0.040 mol) of OBBOC was added thereto at 10° C. and allowed to react for 2 hr. Thereafter, 19.214 g (0.060 mol) of TFDB was dissolved therein, after which 19.334 g (0.060 mol) of BTDA was added thereto and allowed to react for 5 hr. The resulting solution was maintained at room temperature and allowed to react for 18 hr, thereby obtaining a solution having a solid content of 20 wt % and a viscosity of 251 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 11 μm.

Example 15

After a 500 ml reactor equipped with a stirrer, a nitrogen injector, a dropping funnel, a temperature controller and a condenser was purged with nitrogen, 261.525 g of N-methyl-2-pyrrolidone (NMP) was placed in the reactor and 21.976 g (0.060 mol) of 6FAP was dissolved therein, after which 17.707 g (0.060 mol) of OBBOC was added thereto at 10° C. and allowed to react for 2 hr. Thereafter, 12.809 g (0.040 mol) of TFDB was dissolved therein, after which 12.889 g (0.040 mol) of BTDA was added thereto and allowed to react for 5 hr. The resulting solution was maintained at room temperature and allowed to react for 18 hr, thereby obtaining a solution having a solid content of 20 wt % and a viscosity of 241 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Example 16

After a 500 ml reactor equipped with a stirrer, a nitrogen injector, a dropping funnel, a temperature controller and a condenser was purged with nitrogen, 263.038 g of N-methyl-2-pyrrolidone (NMP) was placed in the reactor and 29.301 g (0.080 mol) of 6FAP was dissolved therein, after which 23.610 g (0.080 mol) of OBBOC was added thereto at 10° C. and allowed to react for 2 hr. Thereafter, 6.405 g (0.020 mol) of TFDB was dissolved therein, after which 6.445 g (0.020 mol) of BTDA was added thereto and allowed to react for 5 hr. The resulting solution was maintained at room temperature and allowed to react for 18 hr, thereby obtaining a solution having a solid content of 20 wt % and a viscosity of 238 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 13 μm.

Comparative Example 1

After a 500 ml reactor equipped with a stirrer, a nitrogen injector, a dropping funnel, a temperature controller and a condenser was purged with nitrogen, 269.785 g of N-methyl-2-pyrrolidone (NMP) was placed in the reactor and 32.023 g (0.010 mol) of TFDB was dissolved therein, after which 17.653 g (0.060 mol) of BPDA was added thereto and allowed to react for 5 hr, and 17.770 g (0.010 mol) of 6FDA was then added thereto. The resulting solution was maintained at room temperature and allowed to react for 18 hr, thereby obtaining a solution having a solid content of 20 wt % and a viscosity of 235 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 12 μm.

Comparative Example 2

After a 500 ml reactor equipped with a stirrer, a nitrogen injector, a dropping funnel, a temperature controller and a condenser was purged with nitrogen, 305.792 g of N-methyl-2-pyrrolidone (NMP) was placed in the reactor and 32.023 g (0.010 mol) of TFDB was dissolved therein, after which 44.425 g (0.010 mol) of 6FDA was added thereto and allowed to react for 5 hr. The resulting solution was maintained at room temperature and allowed to react for 18 hr, thereby obtaining a solution having a solid content of 20 wt % and a viscosity of 231 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 13 μm.

Comparative Example 3

After a 500 ml reactor equipped with a stirrer, a nitrogen injector, a dropping funnel, a temperature controller and a condenser was purged with nitrogen, 252.176 g of N-methyl-2-pyrrolidone (NMP) was placed in the reactor and 32.023 g (0.010 mol) of TFDB was dissolved therein, after which 31.021 g (0.010 mol) of ODPA was added thereto and allowed to react for 5 hr. The resulting solution was maintained at room temperature and allowed to react for 18 hr, thereby obtaining a solution having a solid content of 20 wt % and a viscosity of 202 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 13 μm.

Comparative Example 4

After a 500 ml reactor equipped with a stirrer, a nitrogen injector, a dropping funnel, a temperature controller and a condenser was purged with nitrogen, 256.984 g of N-methyl-2-pyrrolidone (NMP) was placed in the reactor and 32.023 g (0.010 mol) of TFDB was dissolved therein, after which 32.223 g (0.010 mol) of BTDA was added thereto and allowed to react for 5 hr. The resulting solution was maintained at room temperature and allowed to react for 18 hr, thereby obtaining a solution having a solid content of 20 wt % and a viscosity of 226 poise. After termination of the reaction, the obtained solution was applied onto a stainless steel plate, cast to a thickness of 10~20 μm, dried with hot air at 80° C. for 20 min, at 120° C. for 20 min and at 300° C. for 10 min, gradually cooled, and then stripped from the stainless steel plate, thus manufacturing a polyimide film having a thickness of 13 μm.

The properties of the polyimide films obtained in Examples and Comparative Examples were evaluated through the following methods. The results are shown in Tables 1 and 2 below.

(1) Measurement of Transmittance

Transmittance was measured three times at 550 nm using a UV spectrophotometer (Konica Minolta CM-3700d) and the measurements were averaged. The results are shown in Table 1 below.

(2) Viscosity

Viscosity was measured two times at 50 rpm using a No. 6 or No. 7 spindle at 25° C. via a Brookfield viscometer (RVDV-II+P) and the measurements were averaged.

(3) Measurement of Yellow Index (Y.I.)

A yellow index was measured in accordance with ASTM E313 using a UV spectrophotometer (Konica Minolta CM-3700d).

(4) Measurement of Birefringence

Each of TE (Transverse Electric) and TM (Transverse Magnetic) modes was measured three times at 532 nm using a birefringence analyzer (Prism Coupler, Sairon SPA4000) and the measurements were averaged.

(5) Measurement of Coefficient of Thermal Expansion (CTE)

A coefficient of linear thermal expansion was measured two times in the range of 50 to 250° C. using a TMA (TA Instruments, Q400) through a TMA method. Here, the sample was 4 mm×24 mm in size, the load was 0.02 N, and the heating rate was 10° C./min.

Since residual stress may be left behind in the film after the film formation, thermal treatment was carried out to thus completely remove residual stress in the first run, after which the value measured after the second run was taken as an actual measurement value.

TABLE 1

| NO. | Composition | Molar ratio | Film Thickness (μm) | Transmittance at 550 nm (%) | Y.I. | CTE (ppm/° C.) |
|---|---|---|---|---|---|---|
| Ex. 1 | 6FAP:IPC/ TFDB:BPDA:6FDA | 0.2:0.2/ 0.8:0.48:0.32 | 12 | 87.39 | 4.87 | 51.59 |
| Ex. 2 | 6FAP:IPC/ TFDB:BPDA:6FDA | 0.4:0.4/ 0.6:0.36:0.24 | 12 | 86.42 | 5.84 | 51.18 |
| Ex. 3 | 6FAP:IPC/ TFDB:BPDA:6FDA | 0.6:0.6/ 0.4:0.24:0.16 | 13 | 83.29 | 9.02 | 48.93 |
| Ex. 4 | 6FAP:IPC/ TFDB:BPDA:6FDA | 0.8:0.8/ 0.2:0.12:0.08 | 13 | 79.42 | 12.57 | 46.11 |

TABLE 1-continued

| NO. | Composition | Molar ratio | Film Thickness (μm) | Transmittance at 550 nm (%) | Y.I. | CTE (ppm/° C.) |
|---|---|---|---|---|---|---|
| Ex. 5 | BAS:DPDOC/TFDB:6FDA | 0.2:0.2/0.8:0.8 | 11 | 88.98 | 3.59 | 56.24 |
| Ex. 6 | BAS:DPDOC/TFDB:6FDA | 0.4:0.4/0.6:0.6 | 13 | 87.25 | 4.97 | 54.22 |
| Ex. 7 | BAS:DPDOC/TFDB:6FDA | 0.6:0.6/0.4:0.4 | 12 | 85.36 | 8.14 | 51.86 |
| Ex. 8 | BAS:DPDOC/TFDB:6FDA | 0.8:0.8/0.2:0.2 | 12 | 82.78 | 10.21 | 47.93 |
| Ex. 9 | BAS:IPC/TFDB:ODPA | 0.2:0.2/0.8:0.8 | 12 | 87.51 | 6.26 | 57.12 |
| Ex. 10 | BAS:IPC/TFDB:ODPA | 0.4:0.4/0.6:0.6 | 13 | 86.36 | 8.09 | 54.24 |
| Ex. 11 | BAS:IPC/TFDB:ODPA | 0.6:0.6/0.4:0.4 | 12 | 85.02 | 10.24 | 50.56 |
| Ex. 12 | BAS:IPC/TFDB:ODPA | 0.8:0.8/0.2:0.2 | 12 | 82.10 | 13.37 | 46.47 |
| Ex. 13 | 6FAP:OBBOC/TFDB:BTDA | 0.2:0.2/0.8:0.8 | 11 | 86.20 | 7.12 | 53.21 |
| Ex. 14 | 6FAP:OBBOC/TFDB:BTDA | 0.4:0.4/0.6:0.6 | 11 | 85.75 | 9.32 | 50.63 |
| Ex. 15 | 6FAP:OBBOC/TFDB:BTDA | 0.6:0.6/0.4:0.4 | 12 | 84.87 | 11.09 | 46.03 |
| Ex. 16 | 6FAP:OBBOC/TFDB:BTDA | 0.8:0.8/0.2:0.2 | 13 | 82.96 | 14.55 | 43.34 |
| Comp. Ex. 1 | TFDB:BPDA:6FDA | 1:0.6:0.4 | 12 | 89.40 | 4.05 | 51.20 |
| Comp. Ex. 2 | TFDB:6FDA | 1:1 | 12 | 90.47 | 1.47 | 57.28 |
| Comp. Ex. 3 | TFDB:ODPA | 1:1 | 13 | 88.09 | 4.35 | 59.69 |
| Comp. Ex. 4 | TFDB:BTDA | 1:1 | 13 | 87.82 | 5.57 | 55.44 |

TABLE 2

| | Prism Coupler | | |
|---|---|---|---|
| No. | TE (Transverse Electric) mode | TM (Transverse Magnetic) mode | Birefringence |
| Ex. 1 | 1.6103 | 1.6009 | 0.0094 |
| Ex. 2 | 1.6095 | 1.6007 | 0.0088 |
| Ex. 3 | 1.6101 | 1.6044 | 0.0057 |
| Ex. 4 | 1.6102 | 1.6073 | 0.0029 |
| Ex. 5 | 1.5600 | 1.5512 | 0.0088 |
| Ex. 6 | 1.5594 | 1.5519 | 0.0075 |
| Ex. 7 | 1.5588 | 1.5528 | 0.0060 |
| Ex. 8 | 1.5578 | 1.5532 | 0.0046 |
| Ex. 9 | 1.6310 | 1.6232 | 0.0078 |
| Ex. 10 | 1.6303 | 1.6235 | 0.0068 |
| Ex. 11 | 1.6302 | 1.6247 | 0.0055 |
| Ex. 12 | 1.6299 | 1.6260 | 0.0039 |
| Ex. 13 | 1.6359 | 1.6248 | 0.0111 |
| Ex. 14 | 1.6360 | 1.6261 | 0.0099 |
| Ex. 15 | 1.6357 | 1.6266 | 0.0091 |
| Ex. 16 | 1.6355 | 1.6273 | 0.0082 |
| Comp. Ex. 1 | 1.6066 | 1.5963 | 0.0103 |
| Comp. Ex. 2 | 1.5604 | 1.5507 | 0.0097 |
| Comp. Ex. 3 | 1.6313 | 1.6227 | 0.0086 |
| Comp. Ex. 4 | 1.6362 | 1.6235 | 0.0127 |

As is apparent from Tables 1 and 2, the polyimide films of Examples 1 to 16 were colorless and transparent, as in Comparative Examples, and exhibited lower birefringence. In particular, heat resistance, represented by the coefficient of linear thermal expansion, was improved by 10% or more. Thereby, as the amount of benzoxazole is increased, heat resistance can be found to increase. However, in Examples 1 to 16, when the molar fraction of the benzoxazole unit structure was increased, heat resistance and birefringence were improved but the optical properties were deteriorated in the above compositions. Hence, in the range of 0<X 0.6, a desired colorless and transparent polyimide-polybenzoxazole film having a yellow index of 10 or less can be obtained.

INDUSTRIAL APPLICABILITY

According to the present invention, a polyimide-polybenzoxazole precursor solution, a polyimide-polybenzoxazole film, and a method of manufacturing the same can be applied to materials for display devices, such as OLEDs, TFT-LCDs, flexible displays, and the like.

The invention claimed is:

1. A method of manufacturing a polyimidepolybenzoxazole film, comprising:
    polymerizing a diaminophenol compound and a dicarbonyl chloride compound, thus preparing a polyhydroxyamide solution (S1);
    adding the polyhydroxyamide solution of S1 with a diamine compound and a dianhydride compound and performing polymerization to give a polyamic acid solution, thus preparing a polyimide-polybenzoxazole precursor solution (S2); and
    casting the polyimide-polybenzoxazole precursor solution on a support and performing ring-closing dehydration through thermal treatment (S3) to give the polyimide-polybenzoxazole film, wherein the diaminophenol compound includes at least one selected from a group consisting of 2,2-bis(3-amino-4-hydroxyphenyl)hexafluoropropane (6FAP) and bis(3-amino-4-hydroxyphenyl)sulfone (BAS), and wherein the dicarbonyl chloride compound includes at least one selected from a group consisting of isophthaloyl chloride (IPC), 4,4'-biphenyldicarbonyl chloride (DPDOC) and 4,4'-oxybis(benzoyl chloride) (OBBOC).

2. The method of claim 1, wherein the polymerizing in S1 is performed at 0° C. to 20° C. for 1 to 2 hrs.

3. The method of claim 1, wherein the polymerization in S2 is performed at 25° C. to 45° C. for 2 to 5 hrs.

4. The method of claim 1, wherein the thermal treatment in S3 is performed for 60 min to 180 min through heating in a temperature range of 80° C. to 300° C.

5. The method of claim 1, wherein a molar ratio of the diaminophenol compound and the dicarbonyl chloride compound in S1 is 1:0.8-1.2, and a molar ratio of the diamine compound and the dianhydride compound in S2 is 1:0.8-1.2.

6. The method of claim 1, wherein a molar ratio of the polyhydroxyamide solution in S1 and the polyamic acid solution in S2 is 0.2-0.8:0.8-0.2.

7. The method of claim 1, wherein a molar ratio of the polyhydroxyamide solution in S1 and the polyamic acid solution in S2 is 0.4-0.6:0.6-0.4.

8. The method of claim 1, wherein the polyimide-polybenzoxazole film has a birefringence of 0.010 or less.

9. The method of claim 1, wherein the polyimide-polybenzoxazole film has a coefficient of linear thermal expansion (CTE) of 55 ppm/° C. or less.

10. The method of claim 1, wherein the polyimide-polybenzoxazole film has a transmittance of 88% or more and a yellow index of 10 or less.

* * * * *